Figure 1:
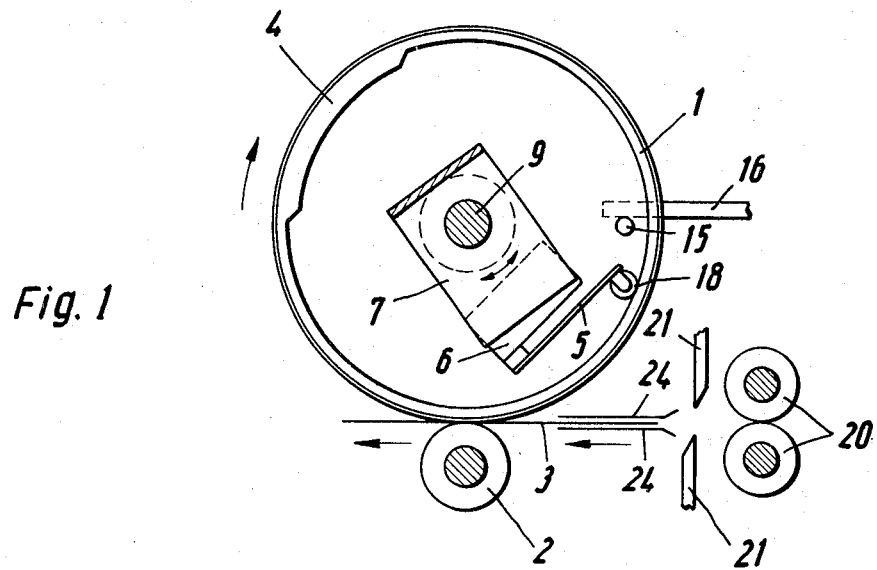

United States Patent

[11] 3,540,644

| [72] | Inventor | Karl Schleifenbaum<br>Haiger, Germany |
|---|---|---|
| [21] | Appl. No. | 771,400 |
| [22] | Filed | Oct. 29, 1968 |
| [45] | Patented | Nov. 17, 1970 |
| [73] | Assignee | Meteor-Siegen Aparatebau Paul Schmeck,<br>G.m.b.H., Siegen,<br>Westphalia, Germany,<br>a corporation of Germany |
| [32] | Priority | Nov. 2, 1967 |
| [33] | | Germany |
| [31] | | 1,623,250 |

[54] APPARATUS FOR MEASURING LENGTHS OF MATERIAL
10 Claims, 2 Drawing Figs.
[52] U.S. Cl. .................................................. 226/136,
33/132, 83/203
[51] Int. Cl. ...................................................... B65h 17/22

[50] Field of Search.......................................... 226/129,
133, 134, 136; 83/203; 33/132, 141

[56] References Cited
UNITED STATES PATENTS

| 2,298,492 | 10/1942 | Longfield | 33/132 |
| 2,984,012 | 5/1961 | Groll | 226/134X |
| 3,207,400 | 9/1965 | Halberg | 226/136 |

Primary Examiner—Richard A. Schacher
Attorney—Olson, Trexler, Wolters and Bushnell ABSTRACT: For measuring off a desired length of material from a continuous roll of that material, a contact roller driven by the material carries a cam which actuates a switch controlling the movement of the material. For each measuring operation, the measuring roller is initially returned by spring means to a starting position, relative to which the position of the switch is set according to the length to be measured off.

Patented Nov. 17, 1970

3,540,644

Inventor:
Karl Schleifenbaum
By: Olson, Trexler, Wolters & Bushnell
attys.

APPARATUS FOR MEASURING LENGTHS OF MATERIAL

The invention relates to apparatus for measuring off selectively predetermined lengths of material, more particularly but not exclusively lengths of copying material in copying appliances and the like. Such apparatus may for example serve for measuring off desired lengths of a negative material from off a storage roll in a copying machine for the production of negatives for offset printing or the like.

In a previous suggestion, measuring off apparatus has been proposed having a fixed cam on a shaft cooperating with a fixed measuring roller. A switch with a contact arm is associated with the cam. When the contact arm is actuated by the relevant cam, the transport of material is switched on or off by the switch. This device has the disadvantage that a fixed cam and associated switch are required for each desired length of material. In order to enable numerous different lengths of material to be measured off with this device, it is accordingly necessary to provide numerous different cams with associated switches and contact arms. This makes the device difficult to construct and consequently expensive. Furthermore, no intermediate lengths between those predetermined by the cams can be measured off.

An object of the invention is to provide apparatus for measuring selectable lengths of material which enables the desired length to be predetermined in simple fashion.

According to the present invention, apparatus for measuring off selectively predetermined lengths of material comprises a measuring roller adapted to be brought into non-slip engagement with the moving material and to be driven by the material, spring means acting on the measuring roller to return that roller to a starting position prior to being driven by the material, and a cam-operated switch and a cooperating cam one of which is carried by the roller and the other of which is mounted for movement about the axis of the roller into selected positions relative to the starting position according to the predetermined length to be measured off, the switch being operated by the cam to prevent further movement of the material.

Preferably, the cam is mounted on the measuring roller and the switch is mounted for selective rotation about the roller axis by means of an endless cord which passes over a first pulley linked to the switch and over a second pulley coupled to a graduated setting knob.

Both the switch with the contact arm and the cam are advantageously arranged inside the measuring roller in order to enable the device according to the invention to take a compact and simple form.

Figure 2:
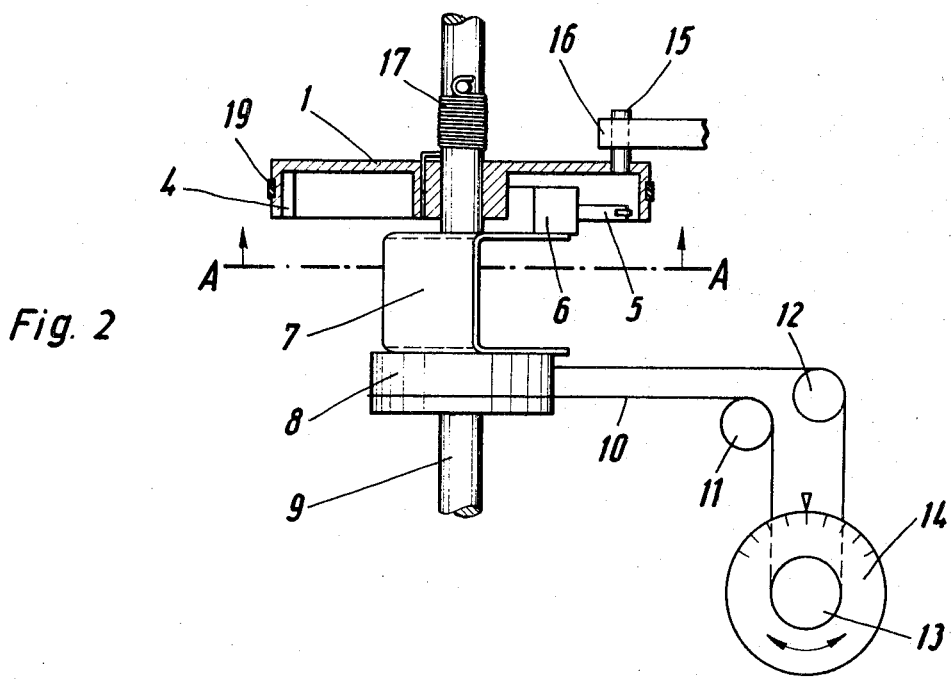

The invention will be more readily understood by way of example from the following description of measuring off apparatus in accordance therewith, reference being made to the accompanying drawing, in which FIG. 1 is a cross section through a measuring roller of the apparatus, taken along the line A-A of FIG. 2, and FIG. 2 is a part-sectioned lateral elevation of the device shown in FIG. 1, with a diagrammatic illustration of the setting device.

Photographic negative material 3 is transported to the left in FIG. 1 by two driving rollers 20, and guided between sheet metal guides 24 to the gap between a measuring roller 1 and a resiliently mounted freely rotatable counter-roller 2. The measuring roller 1 has a rubber band 19 (FIG. 2) on its exterior. A cutter device with knives 21 is provided between the driving rollers 20 and the sheet metal guides 24. The material 3 fed forward by the driving rollers rotates the measuring roller 1 and the counter-roller 2 as it passes through the gap between them, until a cam 4 on the roller 1 actuates the arm 5 of a switch 6 and the latter causes the driving rollers 20 to be withdrawn from one another and the cutter device to cut off the strip 3. After the cutoff, the material 3 is completely transported through the roller gap by devices not illustrated, the measuring roller 1 is returned to its starting position as explained below.

Alternatively the counter-roller 2 may be driven. In this case, the driving rollers 20 and the sheet metal guides 24 may be disposed with, and after the material 3 has been completely measured off the counter-roller 2 is withdrawn from the measuring roller 1, and a cutter device cuts off the measured-off strip at a position directly after the measuring roller 1 in the feed direction. The measuring roller 1, being released, returns to the starting position.

The measuring roller 1 has an internal cam 4 to actuate the arm 5 of switch 6 which is arranged within the measuring roller 1. The switch arm 5 has at its end remote from the switch 6 a roller 18 which bears against the internal surface of the measuring roller 1, and which roller facilitates response to the cam 4.

The switch 6 is mounted on a U-shaped carrier 7 which is fed with a pulley 8, rotatable about its spindle 9, which is also the spindle of the measuring roller 1. An endless cord 10 passes round the pulley 8, runs via deflector rollers 11, 12 round a pulley 13 on a graduated knob 14, and transmits rotation of the graduated knob 14 to the pulley 8, and thus to the switch 6 with the contact arm 5. This enables desired lengths to be set from a control point at which the graduated knob 14 is located.

The rotation of the measuring roller 1 about the spindle 9 is limited by the engagement of a pin 15 carried by the roller 1 with a fixed abutment 16. A spiral spring 17 is attached at one end to the measuring roller 1, and at the other end to the spindle 9, and biases the measuring roller 1 in the anticlockwise direction into the starting position in which the pin 15 comes to bear against the abutment 16, as shown in FIG. 1.

In operation, the desired length of the material 3 to be measured off is set on the graduated knob 14, thus causing the switch 6 to be located in the corresponding position relative to the starting position of the measuring roller 1. The measuring roller 1 is then driven by the material in the clockwise direction until the cam 4 actuates the contact arm 5 and the switch 6 causes the driving rollers 20 to withdraw from one another. The strip of material 3 is transported in the desired length to the left-hand side of FIG. 1, and may be cut off by the cutter device 21. If the counter-roller 2 is driven, it is withdrawn after measurement has taken place, and the cutter device is arranged directly after the measuring roller 1 in the forward feed direction of the material 3.

When the driving connection between the material and the roller 1 is broken the spring 17 returns the measuring roller 1 to its starting position, ready for the next measuring operation.

The apparatus may be designed to prevent damage to the apparatus and waste of material should the transport of material fail to be interrupted. Thus, if the transport of material is not interrupted when the contact arm 5 is actuated by the cam 4 due to failure of the switch 6 or for any other reason, the measuring roller 1 rotates merely until the pin 15 comes to bear against the side of the abutment 16 remote from the starting position of the pin, and there prevents further forward feed of material by means of a switch not illustrated.

Performance of the individual operations and faults therein, for example wrong location of the roll of material in its holder, are indicated in suitable fashion at the control point by means of monitoring lamps.

I claim:

1. Apparatus for measuring off selectively predetermined lengths of material comprising a measuring roller adapted to be brought into nonslip engagement with the moving material and to be driven by the material, spring means acting on the measuring roller to return that roller to a starting position prior to being driven by the material, and a cam-operated switch and cooperating cam one of which is carried by the roller and the other of which is mounted for movement about the axis of the roller into selected positions relative to the starting position, according to the predetermined length to be measured off, the switch being operated by the cam to prevent further movement of the material.

2. Measuring apparatus according to claim 1 in which the cam is mounted on the measuring roller and the switch is mounted for selective rotation about the roller axis by means of an endless cord which passes over a first pulley linked to the switch and over a second pulley coupled to a graduated setting knob.

3. Measuring apparatus according to claim 2 in which the switch pulley carries the switch and is mounted on a common spindle with the measuring roller.

4. Measuring apparatus according to claim 1 in which there is a counter-roller arranged to press the material onto the measuring roller to cause non-slip driving of the measuring roller by the material.

5. Measuring apparatus according to claim 4 in which the counter-roller is driven and is withdrawable from the measuring roller.

6. Measuring apparatus according to claim 1 in which both the switch and the cam are arranged within the measuring roller.

7. Measuring apparatus according to claim 1 in which the switch has an actuating arm including a roller which bears against the measuring roller.

8. Measuring apparatus according to claim 1 in which the measuring roller is embraced by a rubber band.

9. Measuring apparatus according to claim 1 in which the spring means is a spiral spring.

10. Measuring apparatus according to claim 1 in which the measuring roller carries a pin which comes to bear in the starting position against an abutment.